(12) United States Patent
Inoue (10) Patent No.: US 8,421,447 B2
(45) Date of Patent: Apr. 16, 2013

(54) POSITION SENSOR

(75) Inventor: Tetsuji Inoue, Nagoya (JP)

(73) Assignee: Aisan Kogyo Kabushiki Kaisha, Obu-Shi (JP)

( * ) Notice: Subject to any disclaimer, the term of this patent is extended or adjusted under 35 U.S.C. 154(b) by 642 days.

(21) Appl. No.: 12/654,358

(22) Filed: Dec. 17, 2009

(65) Prior Publication Data

US 2010/0181995 A1    Jul. 22, 2010

(30) Foreign Application Priority Data

Jan. 22, 2009  (JP) ................. 2009-011550

(51) Int. Cl.
    *G01B 7/14*    (2006.01)
(52) U.S. Cl.
    USPC ............ 324/207.16; 324/207.17; 324/207.25
(58) Field of Classification Search ............. 324/207.16, 324/207.17, 207.25
    See application file for complete search history.

(56) References Cited

U.S. PATENT DOCUMENTS

| | | | |
|---|---|---|---|
| 5,150,115 | A | 9/1992 | deJong et al. |
| 6,239,571 | B1 | 5/2001 | Shimahara |
| 2008/0223942 | A1 | 9/2008 | Ishii et al. |

FOREIGN PATENT DOCUMENTS

| | | |
|---|---|---|
| JP | U-64-033021 | 3/1989 |
| JP | A-01-124706 | 5/1989 |
| JP | A-03-238315 | 10/1991 |
| JP | A-6-95798 | 4/1994 |
| JP | A-9-170934 | 6/1997 |
| JP | A-2000-292205 | 10/2000 |
| JP | A-2001-41092 | 2/2001 |

OTHER PUBLICATIONS

Chinese Office Action dated Jul. 22, 2011 issued in Chinese Patent Application No. 201010102593.4 (with translation).
May 30, 2012 Chinese Office Action issued in Chinese Patent Application No. 201010102593.4 (with translation).
Sep. 11, 2012 Office Action issued in Japan Patent Application No. 2009-011550 (with English translation).

*Primary Examiner* — Reena Aurora
(74) *Attorney, Agent, or Firm* — Oliff & Berridge, PLC (57) ABSTRACT

An electromagnetic induction type rotary encoder includes an excitation board including an excitation coil, a detection board fixed to a movable element to face the excitation board and including a detection coil placed to face the excitation coil with a clearance therefrom, and a controller for outputting an excitation signal to the excitation coil and processing a detection signal output from the detection coil. The controller includes an excitation circuit for exciting the excitation coil at high frequency and a high-frequency generating circuit, a demodulation circuit for demodulating a signal from the detection coil in accordance with excitation to the excitation coil, a waveform shaping circuit for waveform shaping a signal from the demodulation circuit, and a pulse generating circuit for outputting a pulse signal based on the signal from the waveform shaping circuit. Each of the excitation coil and the detection coil is formed in a meandering coil pattern.

12 Claims, 12 Drawing Sheets

(A) DETECTION SIGNAL

(B) SYNCHRONOUS DETECTION SIGNAL (C) DEMODULATED SIGNAL

FIG. 5

(A) DEMODULATED SIGNAL (B) ZERO CROSS SIGNAL (C) ONE-SHOT PULSE SIGNAL

FIG. 6

(A) EXCITATION SIGNAL (B) DETECTION SIGNAL

FIG. 7

(A) EXCITATION SIGNAL (B) DETECTION SIGNAL

(A) DEMODULATED SIGNAL (THIRD EMBODIMENT)

(B) DEMODULATED SIGNAL (FOURTH EMBODIMENT)

POSITION SENSOR

CROSS-REFERENCE TO RELATED APPLICATIONS

This application is based upon and claims the benefit of priority from the prior Japanese Patent Application No. 2009-011550 filed on Jan. 22, 2009, the entire contents of which are incorporated herein by reference.

TECHNICAL FIELD

The present invention relates to a position sensor to be used for detecting the moving position of a movable element.

BACKGROUND ART

As a technique of this type, heretofore, a rotation sensor has been widely used in various fields. For vehicle engines, a crank angle sensor which is one of rotation sensors is used to detect rotation speed and rotation phase of an engine. One example of this crank angle sensor is described in JP 2001-41092A.

A crank angle sensor using a magnetic pickup is known as a representative example of crank angle sensors. This sensor is mainly used in such a manner that the magnetic pickup constituted of a magnet and a coil is placed to face a gear-shaped magnetic member placed on a rotary shaft, and a clearance distance between the pickup and the magnetic member is changed to thereby output a voltage waveform from the magnetic pickup. A problem of this technique is in that the magnetic pickup has a limitation in sharpening of magnetic flux of a leading end and also the gear-shaped magnetic member has a limitation in the increase in the number of gear teeth, resulting in a limitation in angle resolution.

Furthermore, an optical rotary encoder is generally known as another technique of detecting rotation. One example thereof is described in JP 6(1994)-95798A. However, this optical rotary encoder using light has a problem that is affected by adhesion of contaminants. If a slit is made narrower to increase the resolution, the slit is liable to be obstructed by contaminants. It is therefore difficult to use the optical rotary encoder in hostile environments in which it is apt to be exposed to oil, dust, and others.

Hence, there is an electromagnetic induction type rotary encoder capable of utilizing changes in magnetic field, differently from the optical type, to avoid the problem with contaminants. One example thereof is described in JP9 (1997)-170934A. This type of electromagnetic induction type rotary encoder includes a magnet fixed to a rotary body and a plurality of coil patterns placed to face the magnet and arranged to detect the passage of the magnet in association with the rotation of the rotary body. Those coil patterns are arranged so that their phases are electrically displaced in a coil pattern area on a printed circuit board.

SUMMARY OF INVENTION

Technical Problem

However, in the electromagnetic induction type rotary encoder of JP9(1997)-170934A, even a coil pattern (one turn coil) is induced by a magnet, resultant voltage is insufficient and a correct output signal could not be obtained due to the influence of noise or the like.

The present invention has been made to solve the above problems and has a purpose to provide a position sensor using a specific coil pattern as an excitation coil and a detection coil to generate large induced electric power, thereby increasing an SN ratio of an output signal.

Solution to Problem

To achieve the above purpose, according to one aspect, the invention provides a position sensor of electromagnetic induction type for detecting moving displacement of a movable element, the sensor comprising: an excitation board including an excitation coil; a detection board fixed to the movable element to face the excitation board, the detection board including a detection coil placed to face the excitation coil with a clearance therefrom, each of the excitation coil and the detection coil being formed in a meandering coil pattern; a high-frequency excitation circuit for exciting the excitation coil at high frequency; and a demodulation circuit for demodulating a detection signal output from the detection coil in accordance with excitation to the excitation coil.

According to another aspect, the invention provides a rotary encoder of electromagnetic induction type for detecting a rotation angle of a crank shaft of an engine, comprising: an excitation board having a circular disk shape and including an excitation coil; a detection board fixed to the crank shaft to face the excitation board and having a circular disk shape and including a detection coil placed to face the excitation coil with a clearance therefrom, each of the excitation coil and the detection coil being formed in a meandering coil pattern; a high-frequency excitation circuit for exciting the excitation coil at high frequency; a demodulation circuit for demodulating a detection signal output from the detection coil in accordance with excitation to the excitation coil; a waveform shaping circuit for waveform shaping a demodulated signal output from the demodulation circuit at zero cross; and a pulse generating circuit for generating a one-shot pulse signal in accordance with rising and falling of a zero cross signal output from the waveform shaping circuit.

Furthermore, according to another aspect, the invention provides a rotary encoder of electromagnetic induction type for detecting a rotation angle of a crank shaft of an engine, comprising: an excitation board having a circular disk shape and including two excitation coils; a detection board fixed to the crank shaft to face the excitation board and having a circular disk shape and including two detection coils placed respectively to face the excitation coils with a clearance therefrom, each of the excitation coils and the detection coils being formed in a meandering coil pattern; a high-frequency excitation circuit for exciting each of the excitation coils at high frequency; two demodulation circuits for demodulating detection signals output from the detection coils in accordance with excitation to the excitation coils; two waveform shaping circuits for waveform shaping demodulated signals output from the demodulation circuits respectively at zero cross; and two pulse generating circuits for generating one-shot pulse signals in accordance with rising and falling of zero cross signals output from the waveform shaping circuits respectively; n OR output circuit for outputting the logical OR of the one-shot pulse signals output from the two pulse generating circuits respectively.

Advantageous Effects of Invention

According to the above configurations, each of the excitation coil and the detection coil is formed in a meandering or zig-zag pattern, thus enabling generation of large induced electric power and increasing an SN ration of an output signal of the position sensor. Even if the size of the excitation board and the detection board are made constant, the position sensor can provide enhanced resolution of the output signal.

DESCRIPTION OF EMBODIMENTS

First Embodiment

A detailed description of a preferred first embodiment of a position sensor of the present invention applied to an "electromagnetic induction type rotary encoder" will now be given referring to the accompanying drawings.

Figure 1:
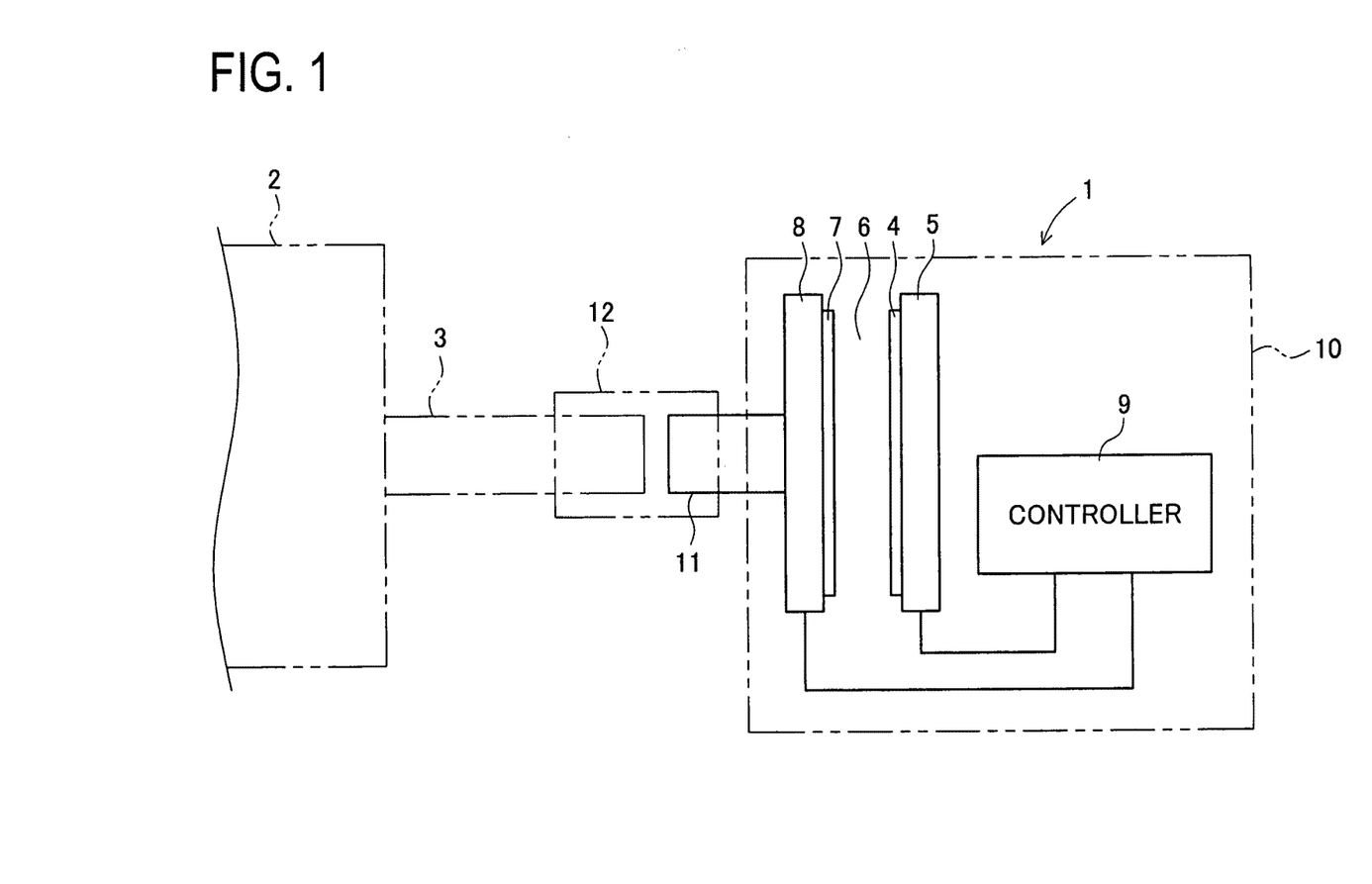
FIG. 1 is a schematic configuration view of a rotary encoder in a first embodiment.

FIG. 1 is a schematic configuration view showing a rotary encoder 1 in this embodiment. As one example, this rotary encoder 1 is provided in correspondence with a crank shaft 3 of an engine 2 and used to detect moving position (rotation angle) of the crank shaft 3. The rotary encoder 1 includes an excitation board 5 including an excitation coil 4, a detection board 8 fixed to the crank shaft 3 to face the excitation board 5 and including a detection coil 7 placed to face the excitation coil 4 with a clearance 6 therefrom, a controller 9 for outputting an excitation signal to the excitation coil 4 and processing a detection signal output from the detection coil 7, and a housing 10 that houses the above components 4 to 9.

The excitation board 5 and the detection board 8 are formed in circular plate shapes having almost the same size. The excitation board 5 is fixed to the housing 10 and the detection board 8 is rotatably supported by the housing 10. The detection board 8 is integrally connected with an input shaft 11 centered on an opposite surface from a surface provided with the detection coil 7. This input shaft 11 is placed to protrude out of the housing 10. The input shaft 11 is integrally rotatably fixed to the crank shaft 3 through a coupling 12.

Figure 2:
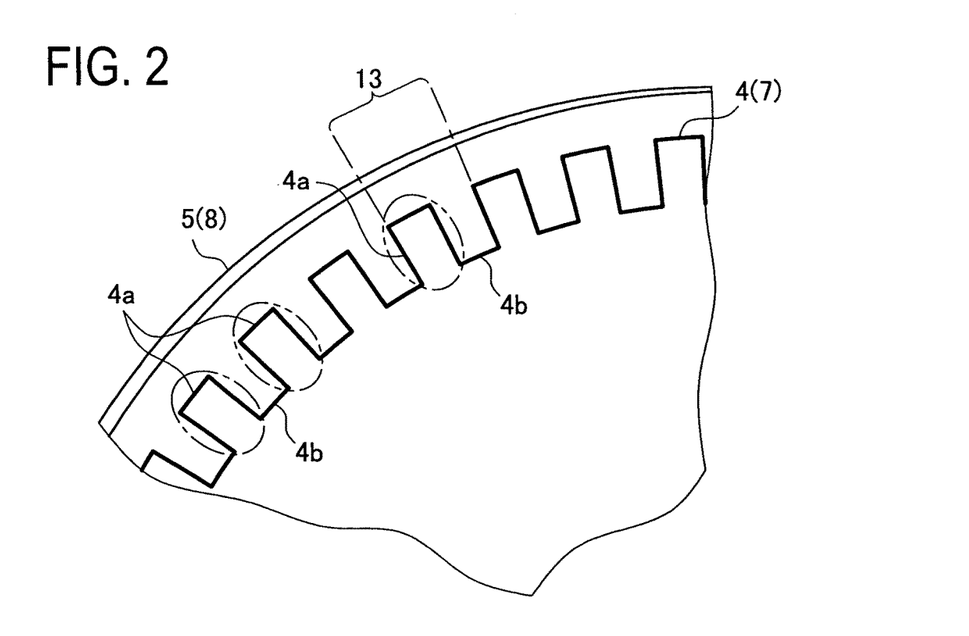
FIG. 2 is an enlarged perspective view of part of an excitation board in the first embodiment.

FIG. 2 is an enlarged perspective view of part of the excitation board 5. The excitation coil 4 is placed in a circle on one surface of the excitation board 5 to extend along an outer peripheral edge thereof. The excitation coil 4 is formed in a "meandering (zig-zag) coil pattern" that meanders in rectangular form. In this embodiment, the "meandering coil pattern" includes for example "three-hundred and sixty" rectangular portions 4a (as surrounded by an elliptic chain line) each protruding toward the outer periphery of the excitation board 5 and connecting portions 4b each of which connects adjacent rectangular portions 4a as shown in FIG. 2. One rectangular portion 4a and one connecting portion 4b adjacent thereto constitute one meandering pattern segment 13 as shown in FIG. 2. The "meandering coil pattern" is constituted of a plurality of the continuous meandering pattern segments 13. The configuration of the detection coil 7 provided on the detection board 8 is also substantially the same as that of the excitation coil 4 mentioned above.

Figure 3:
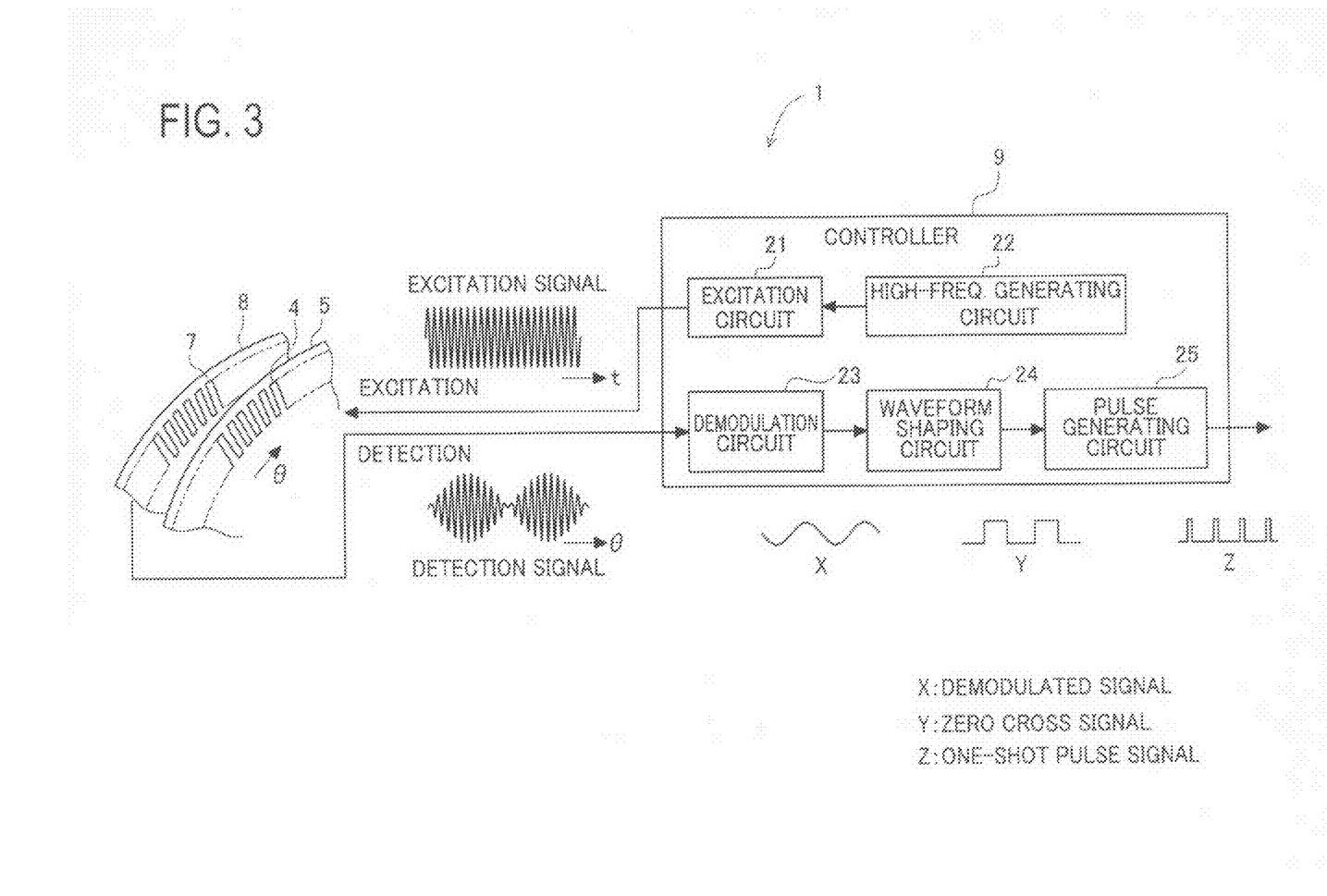
FIG. 3 is a block diagram showing an electrical configuration of the excitation board in the first embodiment.

FIG. 3 is a block diagram showing an electric configuration of the rotary encoder 1. The controller 9 includes an excitation circuit 21, a high-frequency generating circuit 22, a demodulation circuit 23, a waveform shaping circuit 24, and a pulse generating circuit 25. The excitation circuit 21 is configured to excite the excitation coil 4 at high frequency. The high-frequency generating circuit 22 is configured to supply a high frequency to the excitation circuit 21. As this high frequency, for example, a frequency of "500 kHz" is assumed. The demodulation circuit 23 is configured to demodulate and smooth the detection signal output from the detection coil 7 in accordance with excitation to the excitation coil 4. The waveform shaping circuit 24 is configured to shape the smoothed and demodulated signal output from the demodulation circuit 23 into a zero cross signal by zero cross waveform shaping. The pulse generating circuit 25 is configured to generate a one-shot pulse signal according to a rising edge and a falling edge of the zero cross signal output from the waveform shaping circuit 24. In FIG. 3, for convenience, the excitation coil 4 is illustrated on a front surface of the excitation board 5, i.e., an opposite surface from the detection board 8, but actually placed on a back surface of the excitation board 5, i.e., a surface facing the detection board 8.

In the rotary encoder 1 in this embodiment, when the crank shaft 3 is rotated, the detection board 8 is rotated together with the crank shaft 3 and the detection coil 7 is also rotated while facing the excitation coil 4 of the excitation board 5 with the clearance 6 therefrom. At that time, when the excitation coil 4 is excited at high frequency having constant amplitude by the high-frequency generating circuit 22 and the excitation circuit 21, magnetic field lines are periodically generated in the excitation coil 4 and induced electric power is generated in the detection coil 7 facing the excitation coil 4. Thus, the detection coil 7 outputs the induced electric power as a detection signal whose amplitude changes periodically. This detection signal is demodulated by the demodulation circuit 23, so that a low-frequency demodulated signal reflecting the changes in rotation angle (rotation phase) of the crank shaft 3. This demodulated signal is shaped into a zero cross signal by the waveform shaping circuit 24. The zero cross signal is then processed in the pulse generating circuit 25. This pulse generating circuit 25 outputs a one-shot pulse signal is output as a final output signal of the rotary encoder 1.

Herein, the induced electric power to be generated in the detection coil 7 is generated in each of the meandering pattern segments 13 constituting the "meandering coil pattern" of the detection coil 7 and then the sum of the induced electric powers is output as a detection signal from the detection coil 7. Herein, as the detection board 8 is rotated, the phases of the excitation coil 4 and the detection coil 7 repeat a cycle in which they are matched with each other, displaced, and then matched again. The voltage generated in the detection coil 7 becomes the maximum when the phases of the coils 4 and 7 are matched with each other, and subsequently the voltage generated becomes gradually lower as the phases are displaced from each other. Then, positive and negative of the generated voltage is reversed and the generated voltage becomes higher again as the phases of the coils 4 and 7 become matched with each other. Thereafter, the generated voltage becomes lower as the phases become displaced from each other. The positive and negative of the generated voltage are reversed again. Such voltage changes are repeated to cause the detection coil 7 to output a high-frequency detection signal whose amplitude changes periodically.

Figure 4:
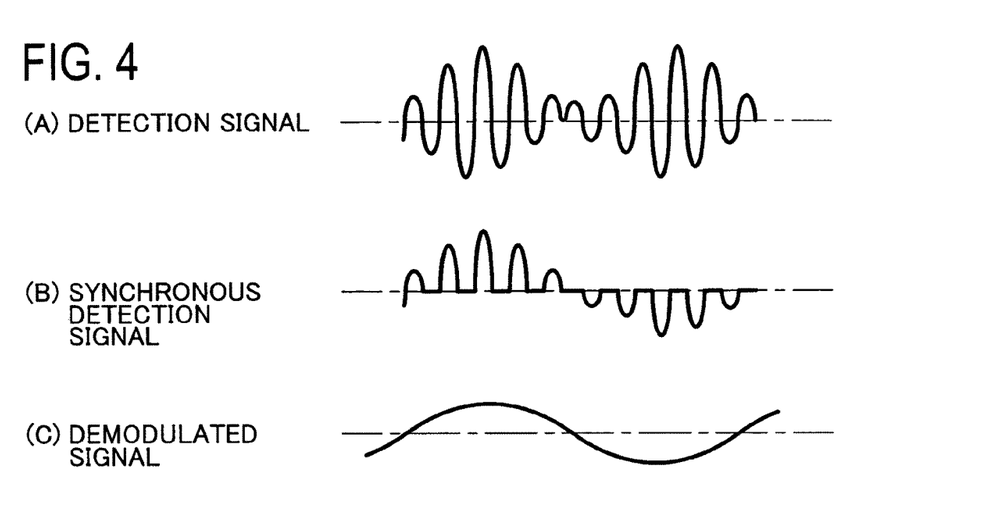
FIG. 4 is a time chart showing changes in various signals in a demodulation circuit in the first embodiment.

FIG. 4 is a time chart showing changes in various signals by the demodulation circuit 23. When a high-frequency detection signal whose amplitude periodically changes as shown in a chart (A) of FIG. 4 is input from the detection coil 7 into the demodulation circuit 23, the demodulation circuit 23 synchronously demodulates the detection signal to convert it to a synchronous demodulated signal whose polarity is periodically changed between positive and negative as shown in a chart (B) in FIG. 4. The demodulation circuit 23 then smoothes the synchronous demodulated signal to produce a low-frequency demodulated signal as shown in a chart (C) in FIG. 4. From the charts (B) and (C) in FIG. 4, it is found that this modulated signal varies according to amplitude changes of the synchronous demodulated signal.

Figure 5:
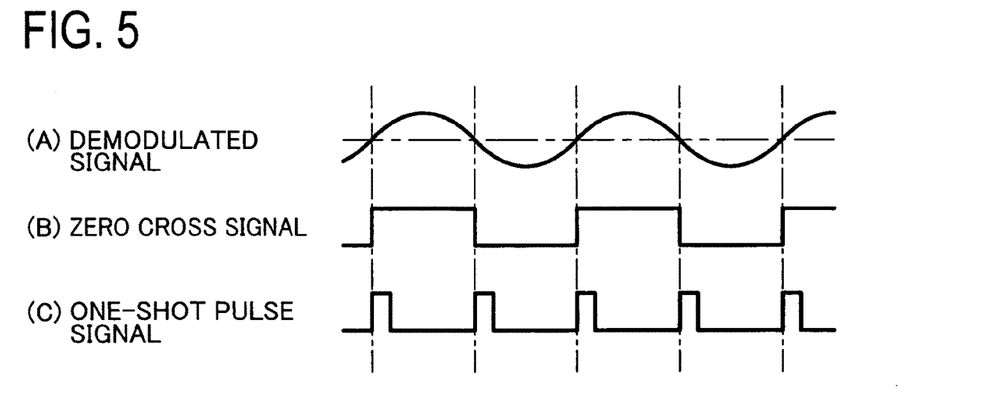
FIG. 5 is a time chart showing changes in a demodulated signal, a zero cross signal, and one-shot pulse signal in the first embodiment.

FIG. 5 is a time chart showing changes in demodulation signal, zero cross signal, and one-shot pulse signal. A demodulation signal from the demodulation circuit 23 is shown in a chart (A) in FIG. 5. A zero cross signal from the waveform shaping circuit 24 is shown in a chart (B) in FIG. 5. A one-shot pulse signal from the pulse generating circuit 25 is shown in a chart (C) in FIG. 5. It is found from the charts (A) and (B) in FIG. 5 that the zero cross signal is a digital signal that rises or falls at the timing when the demodulated signal crosses a zero level. It is found from the charts (B) and (C) in FIG. 5 that the one-shot pulse signal is a pulse signal generated at the timing when the zero cross signal rises or falls.

According to the rotary encoder 1 in this embodiment explained above, the excitation coil 4 and the detection coil 7 are simplified by the "meandering circuit pattern". Since the excitation coil 4 is excited at high frequency, sufficient electromagnetic coupling can be provided between the excitation coil 4 and the detection coil 7 even though simplified. Thus, the detection coil 7 can be supplied with induced electric power of a certain level. Accordingly, the level of the detection signal output from the detection coil 7 is increased and therefore the level of the demodulated signal from the demodulation circuit 23 is increased. As a result, the zero cross signal from the waveform shaping circuit 24 and the one-shot pulse signal from the pulse generating circuit 25 can be correctly output respectively. Specifically, in this embodiment, the use of the "meandering coil pattern" in each of the excitation coil 4 and the detection coil 7 enables generation of relatively large induced electric power, thereby enhancing the SN ratio of the output signal. In other words, in this rotary encoder 1, the coil patterns of the excitation coil 4 and the detection coil 7 can be simplified while the more correct output signals can be generated.

Figure 6:
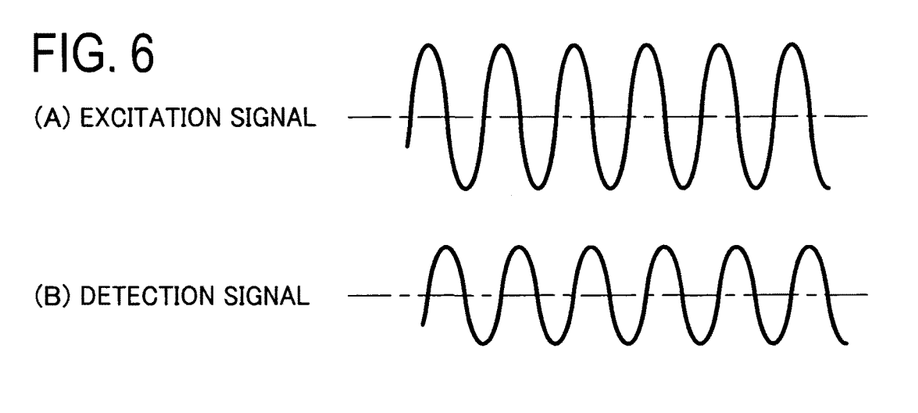
FIG. 6 is a conceptual view of an excitation signal and a detection signal in the first embodiment.
Figure 7:
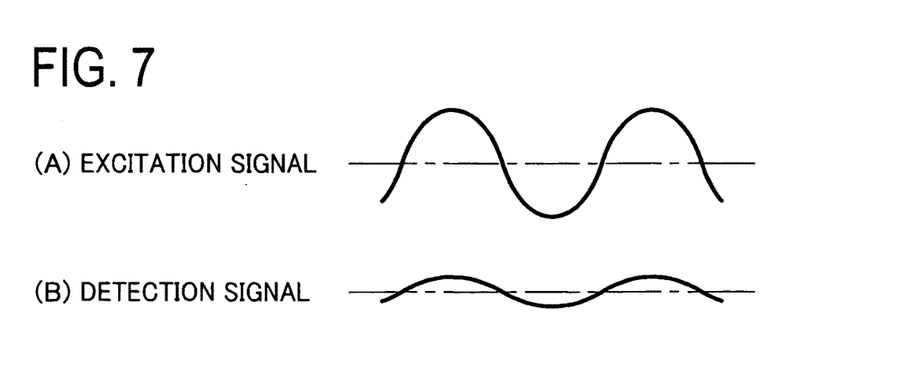
FIG. 7 is a conceptual view of an excitation signal and a detection signal in a comparison example.

FIG. 6 conceptually shows a chart (A) a high-frequency excitation signal to be input to the excitation coil 4 and a chart (B) a detection signal to be output from the detection coil 7 in this embodiment. FIG. 7 conceptually shows a chart (A) a low-frequency excitation signal to be input to the excitation coil 4 and a chart (B) a detection signal to be output from the detection coil 7. As clear from FIG. 6, in this embodiment, the high-frequency excitation signal is input to the excitation coil 4 and therefore a high-frequency detection signal having large amplitude (large level) can also be output from the detection coil 7. On the other hand, in the comparative example shown in FIG. 7, the low-frequency signal is input to the excitation coil and thus a low-frequency detection signal having low amplitude (low level) is output from the detection coil. From comparison between FIGS. 6 and 7, it is found that the present embodiment can enhance the SN ratio of the output signal from the rotary encoder 1.

In this embodiment, furthermore, the excitation coil 4 and the detection coil 7 are each formed in the "meandering coil pattern". This makes it unnecessary to wind a coil by a plurality of turns. The excitation coil 4 and the detection coil 7 can be provided in a relatively compact form on the excitation board 5 and the detection board 8 respectively. Accordingly, even when the excitation board 5 and the detection board 8 remain constant in size respectively, the solution of the output signal from the rotary encoder 1 can be enhanced.

In this embodiment, synchronous demodulation is adopted to demodulate the detection signal from the detection coil 7 by the demodulation circuit 23. It is therefore possible to restrain noise other than the excitation signal and thus the SN ratio of the output signal can further be enhanced.

In this embodiment, the one-shot pulse signal is generated from the pulse generating circuit 25 in accordance with the rising or falling of the zero cross signal output from the waveform shaping circuit 24. Accordingly, as compared with the case where the pulse signal is generated in accordance with only the rising of the zero cross signal, the number of pulse signals is increased. The resolution of the output signal from the rotary encoder 1 can therefore be enhanced more than that in the case where the pulse signal is generated in accordance with only the rising.

Second Embodiment

Next, a second embodiment of the position sensor of the invention applied to an "electromagnetic induction type rotary encoder" will be described below with reference to the accompanying drawings.

In the following embodiments, similar or identical components to those in the first embodiment are given the same reference sings and the details thereof are not repeated here. The following explanation is focused on differences from the first embodiment.

Figure 8:
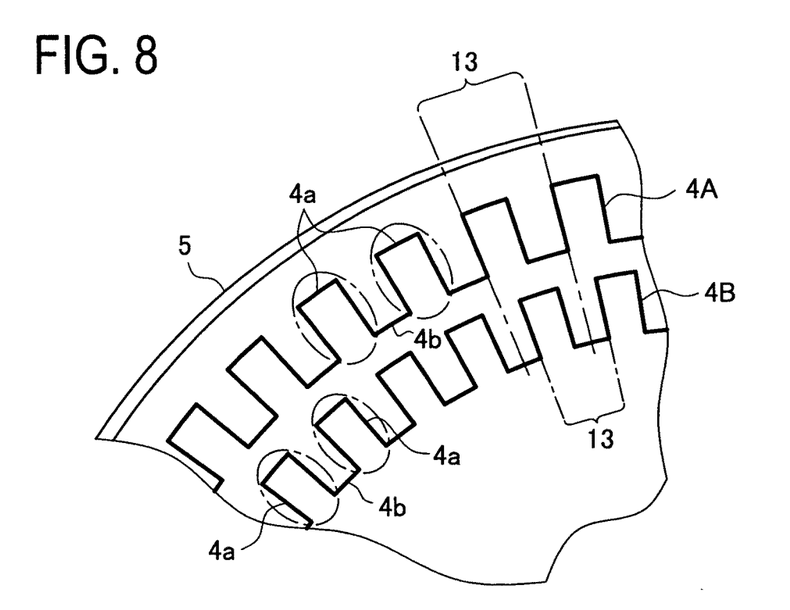
FIG. 8 is an enlarged perspective view of part of an excitation board in a second embodiment.
Figure 9:
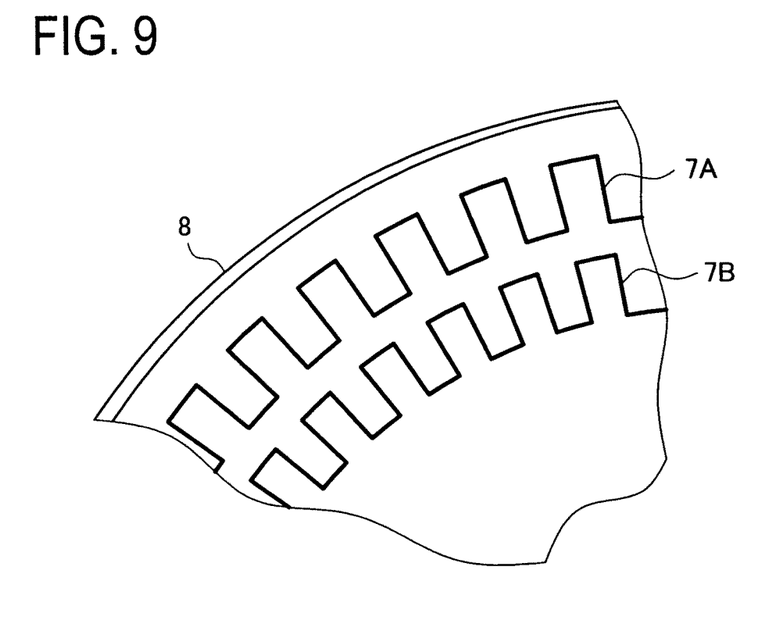
FIG. 9 is an enlarged perspective view of part of a detection board in the second embodiment.
Figure 10:
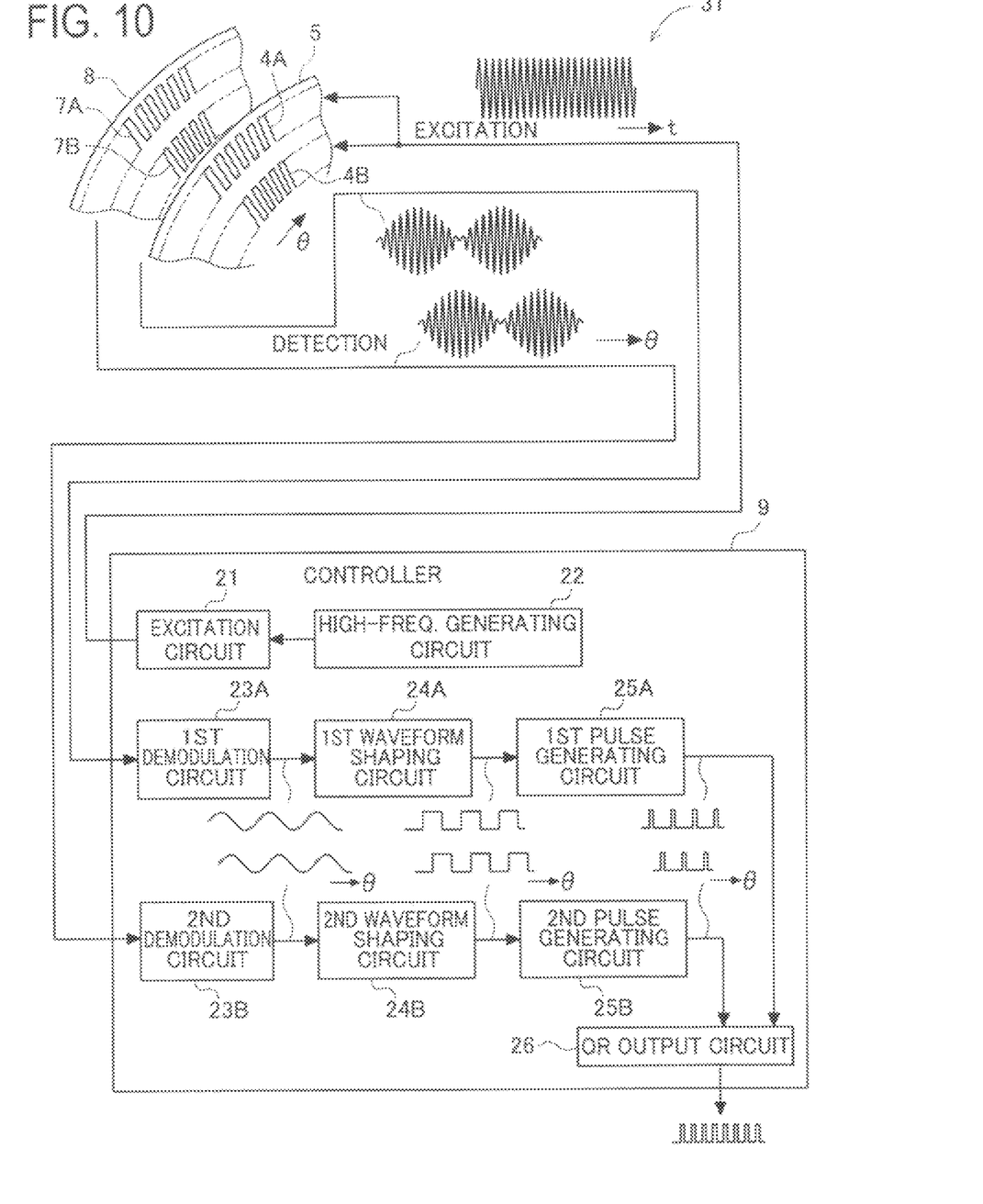
FIG. 10 is a block diagram showing an electrical configuration of a rotary encoder in the second embodiment.

FIG. 8 is an enlarged perspective view of part of an excitation board 5 in this embodiment. FIG. 9 is an enlarged perspective view of part of a detection board 8 in this embodiment. FIG. 10 is a block diagram showing an electric configuration of a rotary encoder 31 in this embodiment. In this embodiment, the excitation board 5, the detection board 8, and a controller 9 are different in configuration from those in the first embodiment.

Concretely, as shown in FIG. 8, the excitation board 5 is provided with a first excitation coil 4A and a second excitation coil 4B arranged in two lines. In other words, two-line coil patterns are constituted of the first excitation coil 4A arranged on the outer side and the second excitation coil 4B arranged on the inner side. These two-line excitation coils 4A and 4B are formed in almost the same "meandering coil patterns" but electrically displaced in phase from each other. The phase displacement between the coils 4A and 4B corresponds to ¼ (90°) of one meandering pattern segment 13 as shown in FIG. 8. The detection board 8 is similarly provided with a first detection coil 7A and a second detection coil 7B arranged in two lines; however, the two-line detection coils 7A and 7B are placed without phase displacement.

In this embodiment, as shown in FIG. 10, the controller 9 includes a first demodulation circuit 23A and a second demodulation circuit 23B respectively corresponding to the first detection coil 7A and the second detection coil 7B arranged in two line, a first waveform shaping circuit 24A and a second waveform shaping circuit 24B corresponding to the demodulation circuits 23A and 23B respectively, a first pulse generating circuit 25A and a second pulse generating circuit 25B corresponding to the waveform shaping circuits 24A and 24B respectively, and a single OR output circuit 26 shared for the pulse generating circuits 25A and 25B. The functions of the circuits 23A, 23B, 24A, 24B, 25A, and 25B are the same as those of the circuits 23 to 25 in the first embodiment. Accordingly, a demodulated signal output from each of the two demodulation circuits 23A and 23B is waveform-shaped at zero cross by the corresponding waveform shaping circuit 24A or 24B. In sync with rising and falling of the zero cross signals output from the waveform shaping circuits 24A and 24B, the two corresponding pulse generating circuits 25A and 25B generate one-shot pulse signals respectively. The OR output circuit 26 outputs an OR signal which is the logical OR of the one-shot pulse signals output from the pulse generating circuits 25A and 25B.

The rotary encoder 31 in this embodiment can achieve the same operations and advantages in terms of the SN ratio of an output signal and the correctness thereof as those in the first embodiment. This embodiment can additionally provide sufficient electromagnetic coupling between the two-line excitation coils 4A and 4B and the two-line detection coils 7A and 7B. Since the two-line excitation coils 4A and 4B are electrically displaced in phase from each other, furthermore, two detection signals with electric phase displacement can be output from the detection coils 7A and 7B. Those two detection signals are demodulated respectively by the two corresponding demodulation circuits 23A and 23B. Thus, two different demodulated signals reflecting the rotation angle of the crank shaft 3 can be obtained. The demodulated signals output from the two demodulation circuits 23A and 23B respectively are waveform-shaped into zero cross signals by the two corresponding waveform shaping circuits 24A and 24B. Based on those zero cross signals, the two pulse generating circuits 25A and 25B output one-shot pulse signals respectively. These two one-shot pulse signals are combined into one in time sequence and output as an OR signal from the OR output circuit 26. Accordingly, the detection signals, the demodulated signals, the zero cross signals, the one-shot pulse signals, and the OR signal can be made more precise without finely forming the "meandering coil pattern" of each of the excitation coils 4A and 4B and the detection coils 7A and 7B. As a result, the rotary encoder 31 can provide double the resolution of the output signal as compared with the rotary encoder 1 in the first embodiment.

Figure 11:
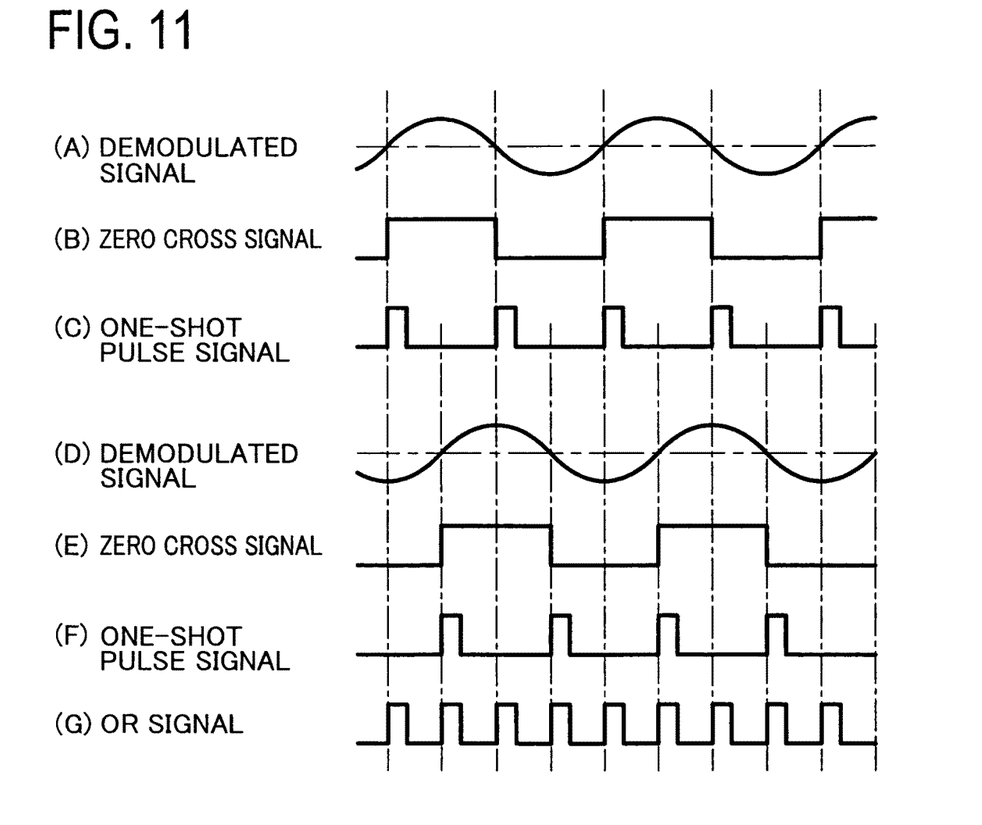
FIG. 11 is a time chart showing changes in two demodulated signals, corresponding zero cross signals, one-shot pulse signal, and OR signals in the second embodiment.

FIG. 11 is a time chart showing changes in two demodulated signals, zero cross signals and one-shot pulse signals corresponding to the two demodulated signals, and an OR signal. In FIG. 11, a chart (A) shows the demodulated signal from the first demodulation circuit 23A; a chart (B) shows the zero cross signal from the first waveform shaped circuit 24A; a chart (C) shows the one-shot pulse signal from the first pulse generating circuit 25A; a chart (D) shows the demodulated signal from the second demodulation circuit 23B; a chart (E) shows the zero cross signal from the second waveform shaping circuit 24B; a chart (F) shows the one-shot pulse signal from the second pulse generating circuit 25B; and a chart (G) shows the OR signal from the OR output circuit 26. As shown in FIG. 11, according to the rotary encoder 31 in this embodiment, two demodulated signals (see the charts (A) and (D) in FIG. 11) output from the two demodulation circuits 23A and 23B respectively corresponding to the two-line detection coils 7A and 7B are waveform-shaped respectively into the zero cross signals (see the charts (B) and (E) in FIG. 11) by the two corresponding waveform shaping circuits 24A and 24B. Based on those two zero cross signals, the two pulse generating circuits 25A and 25B output one-shot pulse signals (see the charts (C) and (F) in FIG. 11). The two one-shot pulse signals output from the two pulse generating circuits 25A and 25B respectively are combined into one in time sequence as the OR signal (see the chart (G) in FIG. 11) and output from the OR output circuit 26. Consequently, the rotary encoder 31 can output, as an output signal, the OR signal obtained by combining double the number of one-shot pulse signals into one.

Third Embodiment

Next, a third embodiment of the position sensor of the invention applied to an "electromagnetic induction type rotary encoder" will be described below with reference to the accompanying drawings.

Figure 12:
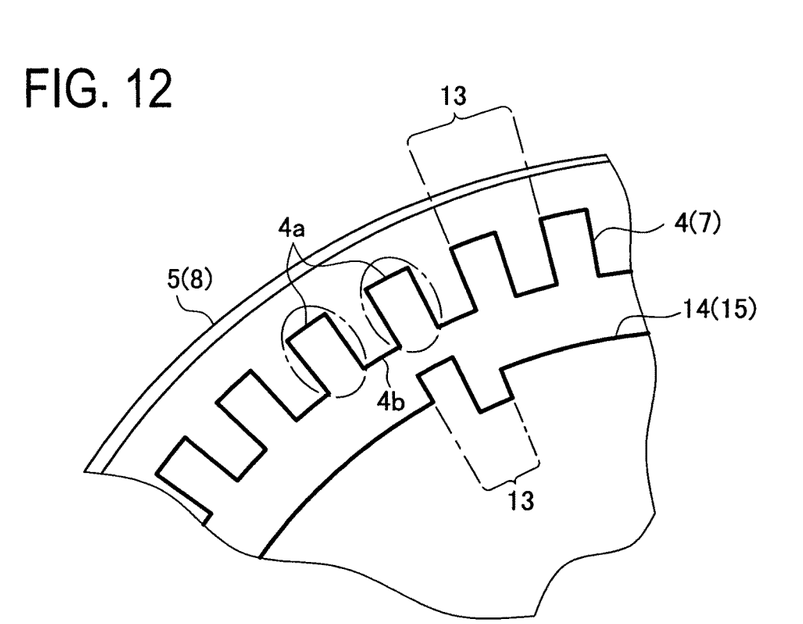
FIG. 12 is an enlarged perspective view of part of an excitation board in a third embodiment.
Figure 13:
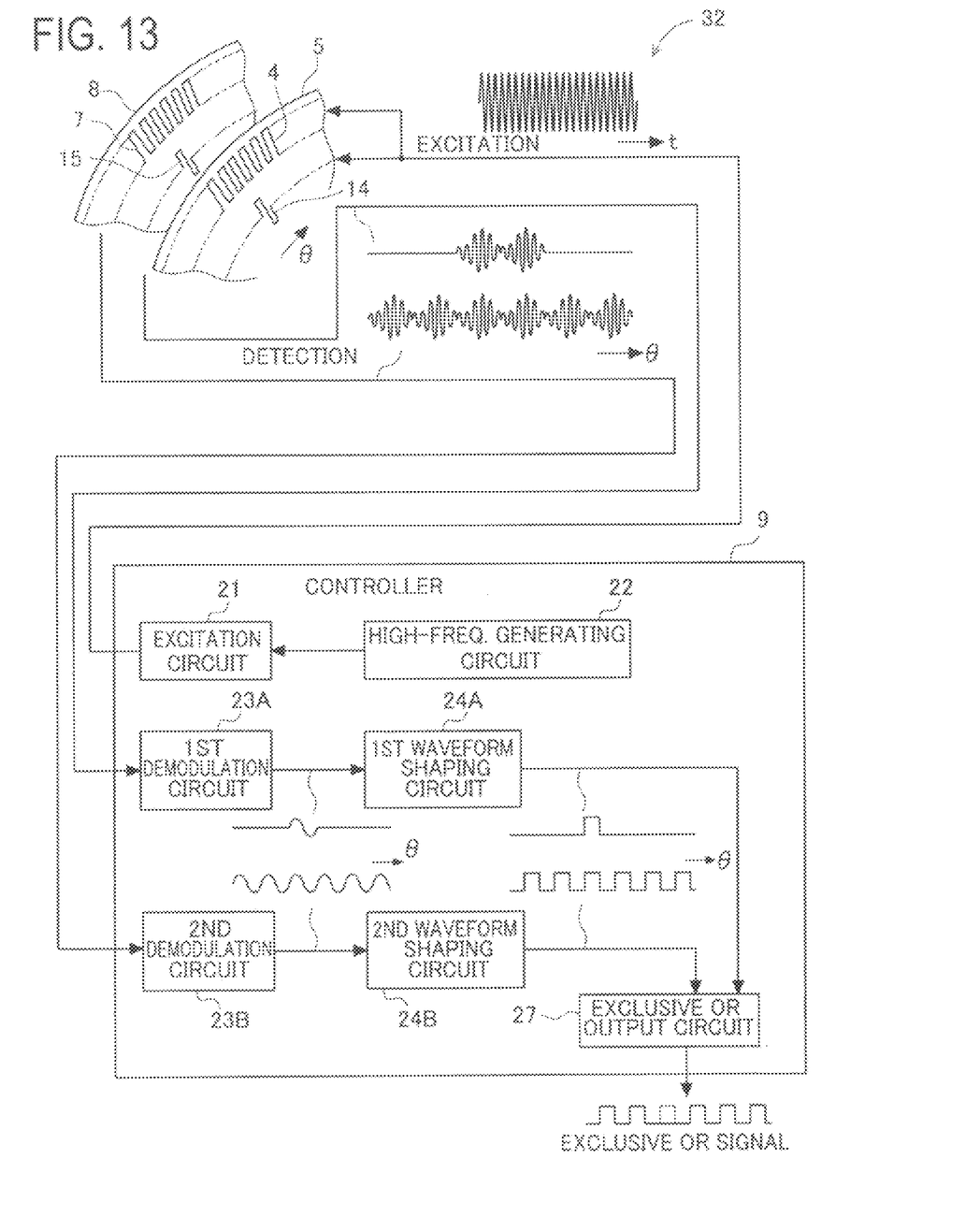
FIG. 13 is a block diagram showing an electrical configuration of a rotary encoder in the third embodiment.

FIG. 12 is an enlarged view of part of an excitation board 5 in this embodiment. FIG. 13 is a block diagram showing an electric configuration of a rotary encoder 32 in this embodiment. In this embodiment, the excitation board 5, a detection board 8, and a controller 9 are different in configuration from those in the first embodiment.

As shown in FIG. 12, specifically, the excitation board 5 is provided with a reference excitation coil 14 arranged on an inner side than an excitation coil 4 and formed with a single meandering pattern segment 13 at only one place per one rotation of a crank shaft 3. The detection board 8 is provided with a reference detection coil 15 arranged on an inner side than a detection coil 7 and formed with a meandering pattern segment 13 to be electromagnetically coupled with the reference excitation coil 14.

In this embodiment, as shown in FIG. 13, the controller 9 includes a second demodulation circuit 23B and a first demodulation circuit 23A corresponding to the detection coil 7 and the reference detection coil 15 respectively, a first waveform shaping circuit 24A and a second waveform shaping circuit 24B corresponding to the demodulation circuits 23A and 23B respectively, and a single exclusive OR output circuit 27 shared between the waveform shaping circuits 24A and 24B. The functions of the circuits 23A, 23B, 24A, and 24B are the same as those of the circuits 23A, 23B, 24A, and 24B in the second embodiment. Thus, the two demodulation circuits 23A and 23B output respective demodulated signals. The demodulated signal output from the first demodulation circuit 23A is a signal that increases and decreases by one cycle corresponding to the single meandering pattern segment 13. The demodulated signal output from the second demodulation circuit 23B is a signal that continuously increases and decreases in repeating fashion. Those demodulated signals are waveform-shaped at zero cross by the corresponding first and second waveform-shaping circuits 24A and 24B. Each waveform-shaping circuit 24A, 24B outputs a zero cross signal. The zero cross signal output from the first waveform-shaping circuit 24A is a single pulse signal corresponding to the signal that increases and decreases by one cycle. The zero cross signal output from the second waveform-shaping circuit 24B is a continuous pulse signal. The exclusive OR output circuit 27 is configured to output an exclusive OR signal obtained by the logical OR of zero cross signals output from the waveform-shaping circuits 24A and 24B. In other words, when one pulse signal is to be output from the first waveform-shaping circuit 24A, the exclusive OR output circuit 27 outputs a signal with one pulse missing from the continuous pulse signal output from the second waveform-shaping circuit 24B.

According to the rotary encoder 32 in this embodiment, the same operations and advantages as those in the first embodiment in terms of the SN ratio of the output signal and the correctness thereof can be achieved. In this embodiment, additionally, the zero cross signal output from the second waveform-shaping circuit 24B through the second demodulation circuit 23B related to the detection coil 7 and the zero cross signal output from the first waveform-shaping circuit 24A through the first demodulation circuit 23A related to the reference detection coil 15 are combined into one in time sequence by the exclusive OR circuit 27 and output as the exclusive OR signal. This exclusive OR signal is a signal with one pulse missing from a continuous pulse train output from the second waveform-shaping circuit 24B. By the missing signal with one pulse missing from the exclusive OR signal, a reference position (an absolute angle of 0°) of the rotation angle of the crank shaft 3 can be detected. Furthermore, a rotation absolute position (the absolute angle) of the crank shaft 3 can be detected by the missing signal and the accumulation of the continuous pulse trains. In this embodiment, moreover, the use of a single signal wire enables simultaneous generation of the signal representing the reference position and the pulse train.

Fourth Embodiment

A fourth embodiment of the position sensor of the invention applied to an "electromagnetic induction type rotary encoder" will be described below with reference to the accompanying drawings.

Figure 14:
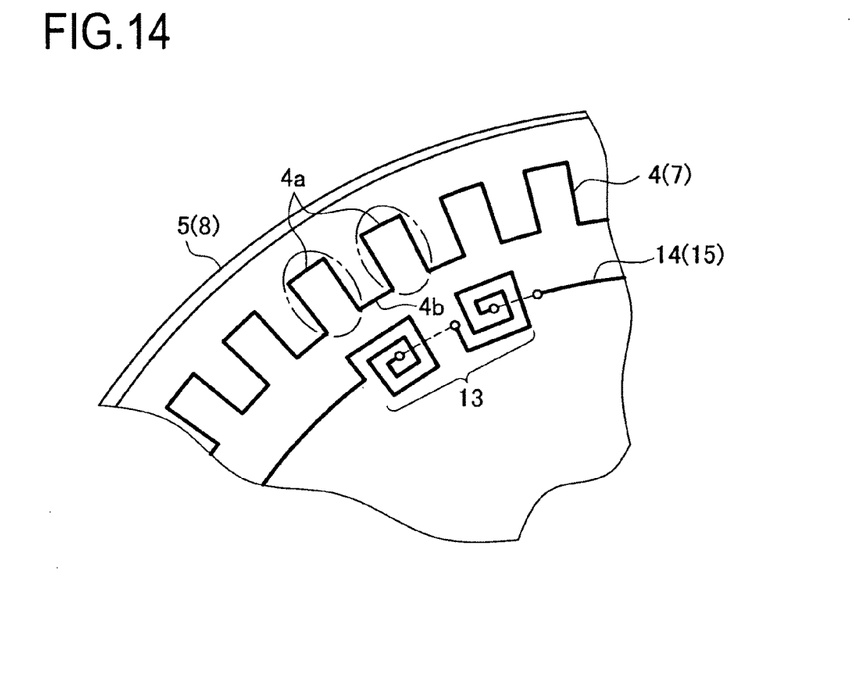
FIG. 14 is an enlarged perspective view of part of an excitation board in the third embodiment.
Figure 15:
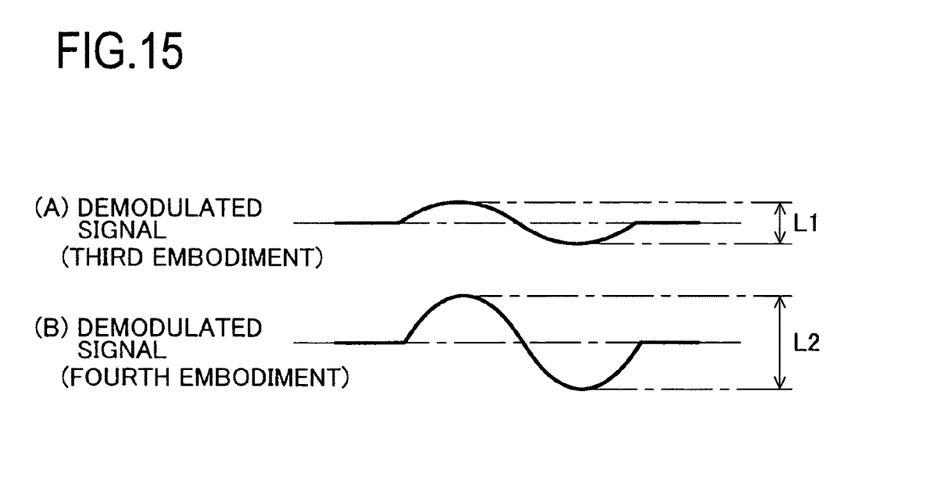
FIG. 15 is a time chart showing differences between a demodulated signal related to a reference detection coil in the third embodiment and a demodulated signal related to a reference detection coil in a fourth embodiment.

FIG. 14 is an enlarged perspective view of part of an excitation board 5 in this embodiment. FIG. 15 is a time chart showing a difference between the demodulated signal related to the reference detection coil 15 in the third embodiment and a demodulated signal related to a reference detection coil 15 in the fourth embodiment. In this embodiment, a reference excitation coil 14 and the reference detection coil 15 are different in configuration from those in the third embodiment. That is, as shown in FIG. 14, a meandering pattern segment 13 of the reference excitation coil 14 is formed in a spiral or eddy pattern. The same applies to the reference detection coil 15.

Accordingly, this embodiment can provide the same operations and advantages as those in the third embodiment. In addition, the reference excitation coil 14 and the reference detection coil 15 each formed in a spiral or eddy pattern are firmly electromagnetically coupled to each other, resulting in an increased level of a detection signal output from the reference detection coil 15. As shown in FIG. 15, therefore, it is found that a level L2 of the demodulated signal in this embodiment is higher than a level L1 of the demodulated signal in the third embodiment. In this embodiment, the demodulated signal and the zero cross signal obtained related to the reference detection coil 15 can be formed in a signal highly resistant to disturbance. As a result, a reference position (an absolute angle of 0°) of the crank shaft 3 can be detected more correctly.

The present invention is not limited to the above embodiments and may be embodied in other specific forms without departing from the essential characteristics thereof.

For instance, the position sensor of the invention is applied to the "electromagnetic induction type rotary encoder" in the above embodiments but also may be applied to an "electromagnetic induction type linear encoder".

INDUSTRIAL APPLICABILITY

The present invention is available for an electromagnetic induction type rotary encoder and an electromagnetic induction type linear encoder.

While the presently preferred embodiment of the present invention has been shown and described, it is to be understood that this disclosure is for the purpose of illustration and that various changes and modifications may be made without departing from the scope of the invention as set forth in the appended claims.

REFERENCE SIGNS LIST

1 Rotary encoder
3 Crank shaft
4 Excitation coil
4A Excitation coil
4B Excitation coil
5 Excitation board
6 Clearance
7 Detection coil
7A Detection coil
7B Detection coil
8 Detection board
13 Meandering pattern segment
14 Reference excitation coil
15 Reference detection coil
21 Excitation circuit
22 High-frequency generating circuit
23 Demodulation circuit
23A Demodulation circuit
23B Demodulation circuit
24 Waveform shaping circuit
24A Waveform shaping circuit
24B Waveform shaping circuit
25 Pulse generating circuit
25A Pulse generating circuit
25B Pulse generating circuit
26 OR output circuit
27 Exclusive OR output circuit
31 Rotary encoder
32 Rotary encoder

The invention claimed is:

1. A position sensor of electromagnetic induction type for detecting moving displacement of a movable element, the sensor comprising:
an excitation board including an excitation coil;
a detection board fixed to the movable element to face the excitation board, the detection board including a plurality of detection coils placed to face the excitation coil with a clearance therefrom, each of the excitation coil and the plurality of detection coils being formed in a meandering coil pattern;
a high-frequency excitation circuit for exciting the excitation coil at high frequency; and
a plurality of demodulation circuits, each of the plurality of demodulation circuits configured to demodulate a detection signal output from the respective one of the plurality of detection coils in accordance with excitation to the excitation coil.

2. The position sensor according to claim 1, wherein
the excitation board is provided with a plurality of excitation coils in a plurality of lines so that the excitation coils are placed with electrical phase displacement from each other, the excitation coils being to be excited at high frequency by the high-frequency excitation circuit, and
the detection board is provided with the plurality of detection coils in a plurality of lines so that the detection coils are placed in the same phase, and a plurality of the demodulation circuits are provided in correspondence with the detection coils.

3. The position sensor according to claim 2 further comprising:
a plurality of waveform shaping circuits for waveform shaping the demodulated signals output from the demodulation circuits respectively at zero cross;
a plurality of pulse generating circuits for generating one-shot pulse signals in accordance with rising and falling of the zero cross signals output from the waveform shaping circuits respectively; and
an OR output circuit for outputting the logical OR of the one-shot pulse signals output from the pulse generating circuits respectively.

4. The position sensor according to claim 1, wherein
the excitation board is provided with a plurality of excitation coils arranged in two lines so that the excitation coils are placed with electrical phase displacement from each other, the excitation coils being to be excited at high frequency by the high-frequency excitation circuit, and
the detection board is provided with the plurality of detection coils arranged in two lines so that the detection coils are placed in the same phase, and two demodulation circuits are provided in correspondence with the detection coils.

5. The position sensor according to claim 4 further comprising:
two waveform shaping circuits for waveform shaping the demodulated signals output from the two demodulation circuits respectively at zero cross;
two pulse generating circuits for generating one-shot pulse signals in accordance with rising and falling of the zero cross signals output from the two waveform shaping circuits respectively; and
an OR output circuit for outputting the logical OR of the one-shot pulse signals output from the two pulse generating circuits respectively.

6. The position sensor according to claim 1, wherein
the excitation board is provided with a reference excitation coil formed with a single meandering pattern only at one place per unit movement amount of the movable element, the reference excitation coil being configured to excite the high-frequency excitation circuit at high frequency, and
the detection board is provided with a reference detection coil formed with a single meandering pattern to be electromagnetically coupled to the reference excitation coil, and another demodulation circuit is provided in correspondence with the reference detection coil.

7. The position sensor according to claim 6, wherein
each of the reference excitation coil and the reference detection coil is formed in a spiral pattern.

8. The position sensor according to claim 7, wherein
an exclusive OR output circuit for outputting an exclusive logical OR of a signal deriving from a demodulated signal to be output from the demodulation circuit related to the detection coil and a signal deriving from a demodulated signal to be output from the other demodulation circuit related to the reference detection coil.

9. The position sensor according to claim 6 further comprising:
an exclusive OR output circuit for outputting an exclusive logical OR of a signal deriving from a demodulated signal to be output from the demodulation circuit related to the detection coil and a signal deriving from a demodulated signal to be output from the other demodulation circuit related to the reference detection coil.

10. The position sensor according to claim 1 further comprising:
a waveform shaping circuit for waveform shaping the demodulated signal output from the demodulation circuit at zero cross, and a pulse generating circuit for generating a one-shot pulse signal in accordance with rising and falling of the zero cross signal output from the waveform shaping circuit.

11. A rotary encoder of electromagnetic induction type for detecting a rotation angle of a crank shaft of an engine, comprising:
an excitation board having a circular disk shape and including an excitation coil;
a detection board fixed to the crank shaft to face the excitation board and having a circular disk shape and including a detection coil placed to face the excitation coil with a clearance therefrom, each of the excitation coil and the detection coil being formed in a meandering coil pattern;
a high-frequency excitation circuit for exciting the excitation coil at high frequency;
a demodulation circuit for demodulating a detection signal output from the detection coil in accordance with excitation to the excitation coil;
a waveform shaping circuit for waveform shaping a demodulated signal output from the demodulation circuit at zero cross; and
a pulse generating circuit for generating a one-shot pulse signal in accordance with rising and falling of a zero cross signal output from the waveform shaping circuit.

12. A rotary encoder of electromagnetic induction type for detecting a rotation angle of a crank shaft of an engine, comprising:
an excitation board having a circular disk shape and including two excitation coils;
a detection board fixed to the crank shaft to face the excitation board and having a circular disk shape and including two detection coils placed respectively to face the excitation coils with a clearance therefrom,
each of the excitation coils and the detection coils being formed in a meandering coil pattern;
a high-frequency excitation circuit for exciting each of the excitation coils at high frequency;
two demodulation circuits for demodulating detection signals output from the detection coils in accordance with excitation to the excitation coils;
two waveform shaping circuits for waveform shaping demodulated signals output from the demodulation circuits respectively at zero cross;
two pulse generating circuits for generating one-shot pulse signals in accordance with rising and falling of zero cross signals output from the waveform shaping circuits respectively; and an OR output circuit for outputting the logical OR of the one-shot pulse signals output from the two pulse generating circuits respectively.

* * * * *